Oct. 24, 1939.　　F. G. NESBITT　　2,176,922
VARIABLE SPEED CORRECTION FOR AUTOMATIC PILOTS
Filed June 16, 1937　　2 Sheets-Sheet 1
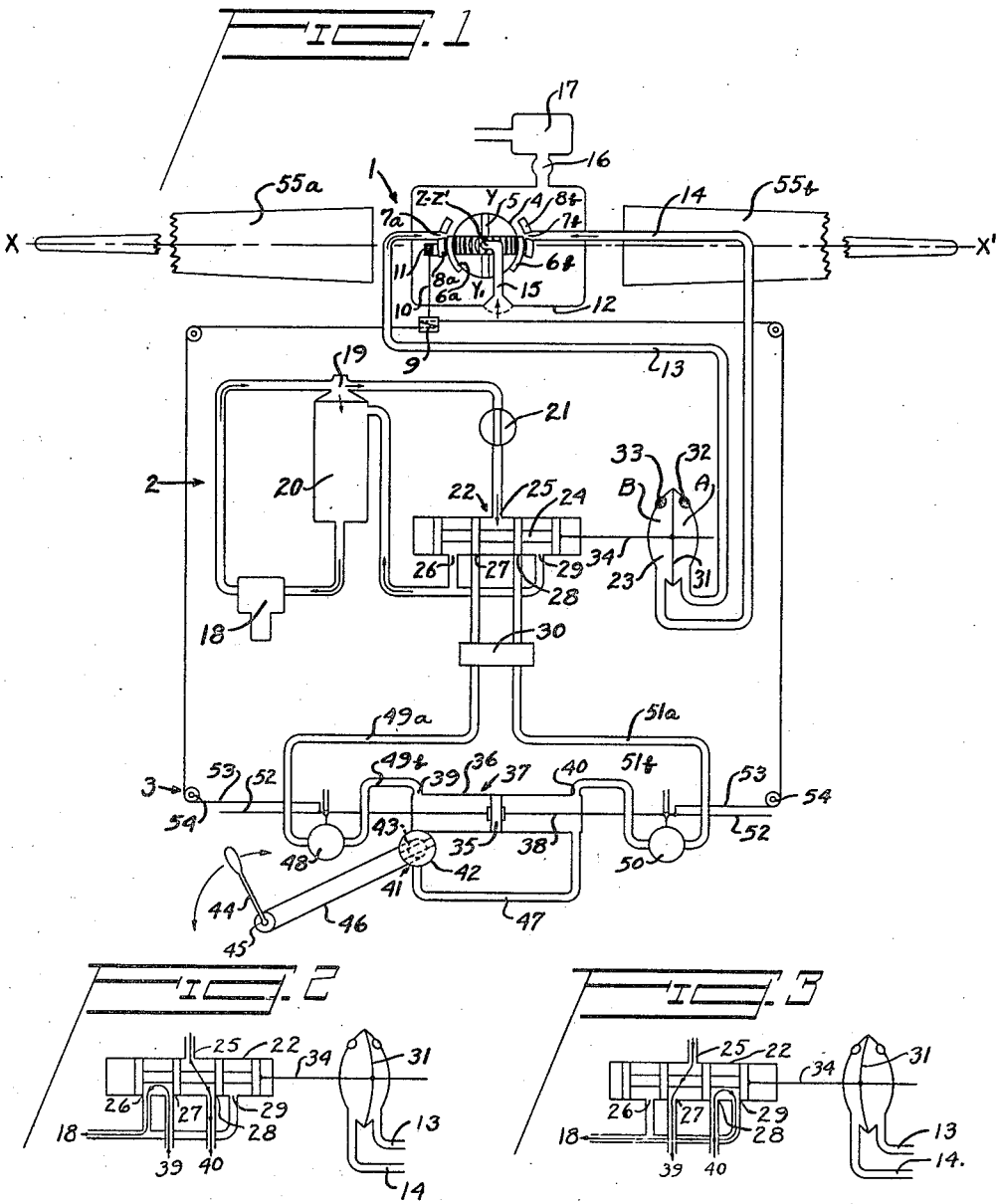

Oct. 24, 1939.  F. G. NESBITT  2,176,922
VARIABLE SPEED CORRECTION FOR AUTOMATIC PILOTS
Filed June 16, 1937   2 Sheets-Sheet 2
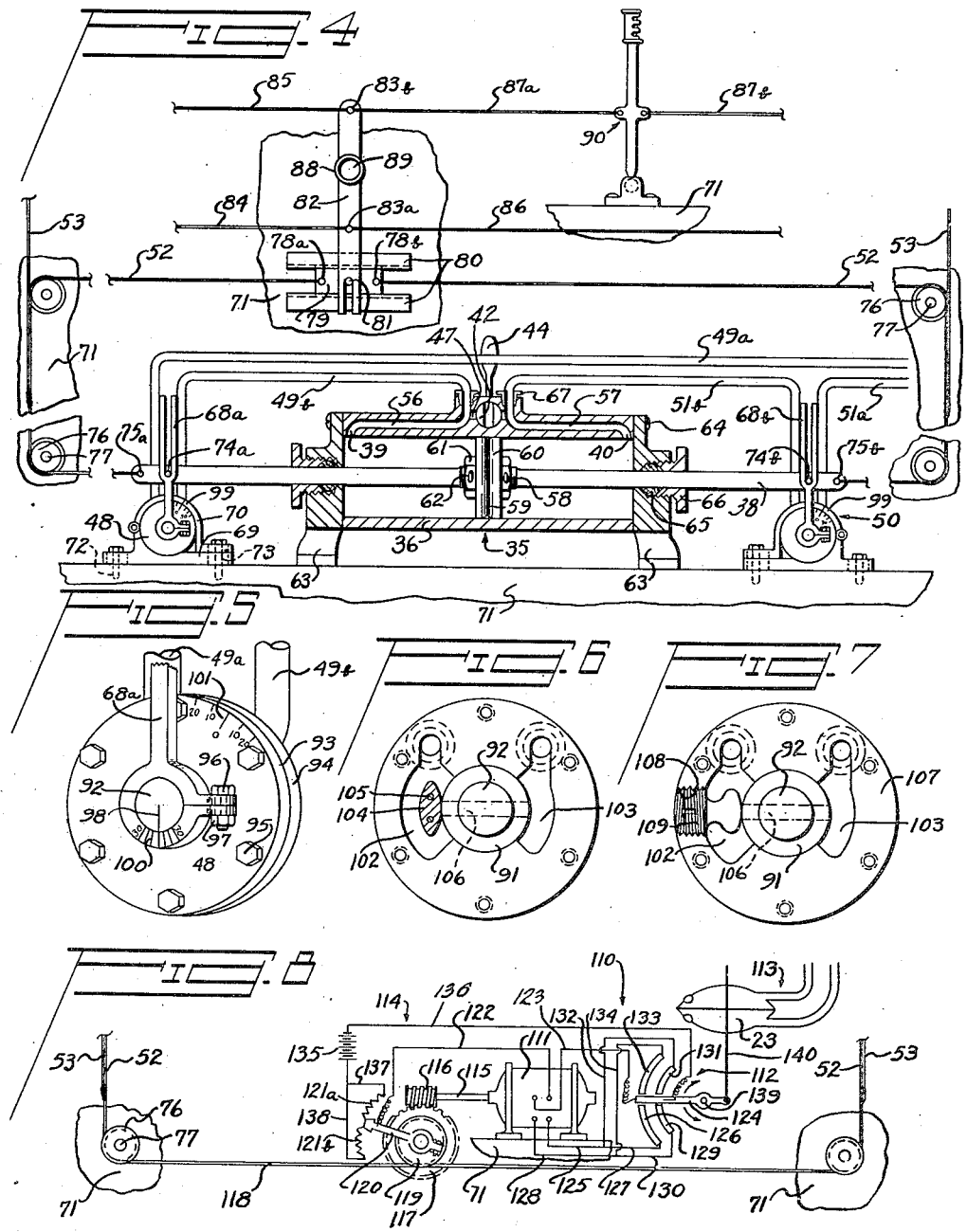
INVENTOR
FRANCIS G. NESBITT
ATTORNEYS Patented Oct. 24, 1939

2,176,922

UNITED STATES PATENT OFFICE 2,176,922

VARIABLE SPEED CORRECTION FOR AUTOMATIC PILOTS

Francis G. Nesbitt, Dayton, Ohio

Application June 16, 1937, Serial No. 148,559

15 Claims. (Cl. 244—76)

(Granted under the act of March 3, 1883, as amended April 30, 1928; 370 O. G. 757)

The invention described herein may be manufactured and used by or for the Government for governmental purposes, without the payment to me of any royalty thereon.

When an experienced airman operates an airplane manually, he applies corrections to the control surfaces at different rates depending on the magnitude of the disturbance and thereby obtains very smooth flight. That is, for very small corrections required to keep the airplane on a predetermined course and level, he moves the controls "very slowly". When disturbances or gusts and bumps are encountered, greater corrections are required and they must be applied much more quickly in order to obtain maximum smoothness. The airman learns by experience and subconsciously applies corrections faster for large disturbances, although the small corrections required to keep the airplane level and on course are applied very slowly.

In automatic pilots now being used, the speed of correction (i. e., the speed at which the control surfaces are moved) is a constant value. This constant value is adjustable manually for different predetermined conditions. Experience has shown, however, that there is much room for improvement with these automatic pilots with regards to flight smoothness. With correction speed manually set "low" for smooth air, the automatic pilot will not fly the airplane smoothly in disturbed air because the control surfaces are not moved fast enough. When the correction speed is manually set "high" for disturbed air, the control surfaces are moved so fast that the small corrections are applied very rapidly, resulting in extremely mechanical and unnecessarily rough flight. Under average flight conditions the automatic pilot must serve two purposes; namely, it must continuously apply corrections "very slowly" to keep the airplane on a predetermined course and level and, secondly, it must quickly counter-act periodic air disturbances which occur irregularly at longer intervals. With the conventional automatic pilot, it is not practical to continuously change the manual correction speed setting to operate satisfactorily during the two functions just described. The result is that present automatic pilots do not provide as smooth a flight as may be obtained by the human pilot except under very specific conditions which do not always exist.

The purpose of my invention is to provide a simple means whereby an automatic pilot will continuously apply corrections "very slowly" to keep the airplane on a predetermined course and level, and with the same setting apply corrections "very quickly", when required, to counteract periodic air disturbances or bumps and gusts.

My invention produces a variable correction speed and is arranged so that the minimum speed is obtained at and near the zero or neutral position of the servo mechanism. As the servo mechanism departs from the neutral position in either direction, the correction speed is automatically increased. Therefore, large corrections are produced more rapidly and small corrections are produced very slowly. The rate of change of correction speed is adjustable in order to be useful on airplanes of different types.

Although my invention is primarily a device to improve the performance of automatic pilots, it should be understood that it is applicable to any automatic mechanism incorporating a servo unit. For example, this variable correction speed may be used to advantage in the relay mechanism which automatically sets the heading on an automatic pilot by the signal received from a radio compass or homing device. Another example would be use in connection with the automatic operation of engine controls and/or propeller pitch controls.

In the description that follows, one servo unit only is shown. In an automatic pilot, there are actually three of these units, one each for the aileron, the elevator and the rudder controls. This invention is illustrated in the following description by two methods; first, a special restriction valve or valves used in conjunction with an hydraulic type servo unit, and second, an arrangement using a rheostat in conjunction with an electric type servo unit. It should be understood that other arrangements may be used without departing from the spirit of the invention, such as pneumatic mechanisms, etc.

Referring to the drawings, in which numerals of like character designate similar parts throughout the several views—

Figure 1 is a schematic representation of a well known form of hydraulically operated automatic pilot;

Figure 2 represents fluid flow for left wing low correction;

Figure 3 represents fluid flow for right wing low correction;

Figure 4 is a side elevation, in partial cross-section, of one embodiment of my invention applied to the above automatic pilot;

Figure 5 is a perspective view of my variable restriction valve;

Figure 6 shows partial disassembly of Figure 5;

Figure 7 shows minor modification of Figure 6; and

Figure 8 shows a side elevation of a second embodiment of my invention applied to the above automatic pilot.

In the schematic representation of Figure 1, a gyro unit 1 (intended only for association with the aileron controls of an aircraft) is operably connected to a control unit 2 governing fluid flow to a servo-unit 3. An inner gimbal ring 4 of a rotor 5, is mounted to pivot about an axis Z—Z' normal to gyro axes Y—Y' and X—X' at their point of common intersection. The axis X—X' is intersected by two spherically formed baffle plates 6a and 6b, fixed to and rotating with the gimbal ring 4. The upper edges of the baffle plates 6a and 6b are arranged to partially cover respectively, jet openings 7a and 7b provided in a second set of spherically formed plates 8a and 8b, closely superimposed about the outer surfaces of the baffle plates 6a and 6b. The plates 8a and 8b are pivoted as a single unit above axis Z—Z' by means of a pulley 9, a shaft 10 and a gear 11, supported by a box 12. Air pickoffs 13 and 14 are flexibly connected to the jet openings 7a and 7b. A rotor jet 15 is fixed to the box 12, as indicated, the gyro unit 1 being completed by installation of a suction regulator 16 and a suction pump 17 at the upper right hand portion of the box 12.

The control unit 2 is composed of an oil pump 18, an oil pressure regulator 19 operably connected to an oil sump 20 and a speed control valve 21, a balanced oil valve 22, and an air relay 23. As shown in Figure 1, the pump 18 continues to by-pass through the oil sump 20. The balanced oil valve 22 is provided with an axially slidable valve 24, a principal oil inlet 25 connected with the speed control valve 21, oil outlets 26 and 29 connected with the oil sump 20, and oil inlets-outlets 27 and 28 connected with an oil pressure regulator 30. The air relay 23 is divided into separate chambers B and A by means of a central diaphragm 31. Air is sucked into chamber A through a port 32 and from thence into the air pickoff. Air is sucked into chamber B through a port 33 and from thence into the air pickoff 14. The center of the diaphragm 31 is operably connected to the right extremity of the slidable valve 24 by means of a connecting rod 34.

The servo-unit 3 consists of a motor 35 including a cylinder 36, a piston 37, a piston rod 38 and inlets-outlets 39 and 40; a by-pass 41 including a valve 42 with a pulley 43 fixed to the rotor thereof, a control handle 44 with a pulley 45 fixed to the base thereof, a cable 46 interconnecting pulleys 43—45 and a by-pass pipe 47; a restriction valve 48 interconnected to the oil pressure regulator 30 and the inlet-outlet 39 by means of pipes 49a and 49b; a restriction valve 50 interconnected to the oil pressure regulator 30 and the inlet-outlet 40 by means of pipes 51a and 51b; a cable 52 adapted to be operably connected to the aileron controls of an aircraft; and a cable 53 passing over pulleys 54 and operably connected with the pulley 9 of the gyro unit 1.

In the description of the operation of the three "units" of Figures 1, 2, and 3, the restriction valves 48 and 50 are first considered as completely removed from the figures in order that the operation of automatic pilots existing prior to my invention may be clearly understood; i. e., inlets-outlets 39 and 40 of the servo-unit 3 are described as directly connected to the oil pressure regulator 30 of the control unit 2. The effect of introducing the restriction valves 48 and 50 is covered in the description of Figures 4, 5, 6 and 7. As shown in Figure 1, the aircraft to which the gyro unit 1 is attached is being momentarily maintained in level flight; i. e., the combined longitudinal axes of wing panels 55a and 55b, as well as the axis X—X' of the rotor 5, are being maintained coincidental (as viewed from the propeller end of the aircraft). During continuation of such wing attitude, the suction pump 17 exhausts relatively equal volumes of air from chambers A and B of the air relay 23 (through, respectively, air pickoffs 13 and 14 and the equally partially covered jet openings 7a and 7b). The diaphragm 31 and the slidable valve 24 remain in the central positions shown in Fig. 1 such that no oil will be discharged from the oil pressure regulator 30 to the cylinder 36 of the servo unit 3.

Let it be assumed that disturbed air causes wing panel 55b to fall below true horizontal (a condition known to the art as "left wing low"—pilot's viewpoint). Counterclockwise rotation of the baffle plate 6b from the parts showing of Figure 1 causes momentary coverage of the jet opening 7b, whereupon the diaphragm 21 and the slidable valve 24 of the control unit 2 assume the positionings of Fig. 2. Fluid from the oil pressure regulator 30 thereupon commences to flow through the inlet-outlet 40 of the motor 35, causing the piston rod 38 and the cable 52 attached thereto to move to the left of the parts showing of Figure 1, such that the aileron of wing panel 55b is depressed and the aileron of wing panel 55a is elevated. In order that over-controlling of the ailerons may be prevented, as soon as the piston rod 38 moves to the left, the cable 53 attached to the pulley 9 of the gyro unit 1 executes a clockwise movement, causing an immediate counter-clockwise movement of the plates 8a and 8b. Through combination of the aforesaid parts movements, the wing panel 55b is restored to normal lateral attitude.

If disturbed air causes "right wing low" attitude of the aforesaid wing panels, the diaphragm 21 and the slidable valve 24 of the control unit 2 assumes the positioning of Figure 3. The piston rod 38 and the cable 52 attached thereto move to the right of the parts showing of Figure 1 such that the aileron of the wing panel 55a is depressed and the aileron of the wing panel 55b is elevated. The aforesaid movements are immediately followed by clockwise movements of the plates 8a and 8b. Through combination of the aforesaid parts movements, the wing panel 55a is restored to a normal lateral attitude. During take-off and landing of an aircraft, it may prove desirable for the pilot to retain manual control of the aforesaid ailerons. Such control is assured by counterclockwise rotation of the control handle 44 into true horizontal, thereby by-passing the piston 37 with respect to the inlets-outlets 39 and 40 of the servo unit 3.

In Figure 4, I show the detailed structure of the servo unit 3. It will be noted that the valve 42 and the pipe 47 are built directly into the cylinder 36 of the motor 35, as are passages 56 and 57 connecting inlets-outlets 39 and 40 with pipes 49b and 51b (to restriction valves 48 and 50 of the servo unit 3). The piston rod 38 is provided with an enlarged central threaded portion 58, upon which are assembled a piston leather 59, piston washers 60, check nuts 61, and cotter pin 62. The two open ends of the cylinder 36 are provided with cylinder headers 63, fixed thereto by means of screws 64. The cylinder headers 63 are provided with the customary packing glands 65 and packing gland nuts 66.

In the hereinabove referred to automatic pilot, the inlets-outlets 39 and 40 of the servo unit 3 are connected to that control unit of the automatic pilot which controls lateral attitude of the aircraft. It must be kept clearly in mind that this same arrangement is duplicated for both the longitudinal and directional control of an aircraft. The pipes 49a and 51a, from the oil pressure regulator 30 of the control unit 2 are directly connected to the inlet openings of restriction valves 48 and 50. The outlet openings of the restriction valves 48 and 50 are thereafter directly connected with the passages 56 and 57 by means of a pipe 49b, a pipe 51b and pipe connections 67. The restriction valves 48 and 50 are provided respectively with forked levers 68a and 68b radially adjustable as described in Figure 5. It will be further noted that both of the aforesaid valves are cradled in bases 69, provided with hinged straps 70, and that they are laterally adjustably secured to a supporting structure 71 by means of screws 72 passing through longitudinally slotted openings 73 provided in the bases 69.

Referring again to Figure 4, the piston rod 38 is provided at its outer two extremities with detachable driving pins 74a and 74b, adapted to remain in constant engagement with the inner surfaces of the forked levers 68a and 68b. The tip extremities of the piston rod 38 are also provided with openings 75a and 75b to which are secured the inner ends of the cable 52. The cable 53 is spliced to the cable 52, as indicated. The side-portions of the cable 52 are supported by pulleys 76 secured to the structure 71 by means of bearing pins 77, the upper mid-portion thereof being fixed to openings 78a and 78b provided in a sliding plate 79. The sliding plate 79 moves laterally in guide plates 80 fixed to the structure 71 and is further provided with a driven pin 81 at its central portion. The driven pin 81 is adapted to be in constant engagement with the inner surfaces of a forked lever 82. The forked lever 82 is provided with openings 83a and 83b to which are fixed aileron control cables 84, 85, 86 and 87a and with a mounting boss 88, which is rotatably secured to the structure 71 by means of a bearing shaft 89. The right hand end of the cable 87a is fixed to a pilot's aileron control stick 90, from the right side of which further continues aileron cable 87b. Manual control of the ailerons cannot be utilized until the pilot aligns the central opening in the valve 42 (of the motor 35) with the by-pass opening 47 provided between passages 56 and 57 of the housing 36, through rotation of the control handle 44 fixed to an outer end of the valve 42.

Figure 5 shows an enlargement of the restriction valve 48. The interior of the valve is provided with a valve rotor 91 from which projects a driving shaft 92. The aforesaid parts are encased in a top housing 93 and a bottom housing 94, secured in assembled relationship by means of screws 95. The forked lever 68a is adjustably secured to the driving shaft 92 by means of a bolt 96 and nut 97. It will be noted that the outer surface of the driving shaft 92 is provided with a reference line 98, while the hinged strap 70 securing the top housing 93 is provided with a similar reference line 99. The aforesaid reference lines permit accurate angular adjustment of the forked lever 68a and the driving shaft 92 through associated and numeraled graduations 100 provided on the outer surface of the former, while similar angular adjustment of the restriction valve 48, with reference to the structure 71, and therefore alignment with the longitudinal axis of the piston rod 92 is accomplished by means of further numeraled graduations 101 provided on the outer surface of the top housing 93.

Referring jointly to Figures 5 and 6, it will be noted that the bottom housing 94 is provided with inlet and outlet cavities 102 and 103 which are in direct communication, respectively, with the pipes 49a and 49b, fixed to the rear surface of the aforesaid housing by means of pipe connections. The inlet cavity 102 is provided with a metering block 104, fixedly secured by means of pins 105. It will be noted that the metering block 104 is very close to the outer left hand extremity of a cylindrical opening 106, provided in the valve rotor 91, and therefore the maximum restriction to the fluid flow is obtained in the position shown.

Figure 7 shows minor modification of the structure of Figure 3 in that the bottom housing 107 is provided with a threaded opening 108, adapted to adjustably secure a metering screw 109. Through the aforesaid arrangement, the maximum restriction at the neutral position between the inner end of the metering screw 109 and the left hand extremity of the cylindrical opening 106 may be varied at will, whereas in the arrangement Figure 6, the metering block 104 must be replaced to make this adjustment. The arrangement shown in Figure 7 will also permit the use of interchangeable metering screws 109 with different end profiles without the necessity for dismantling the valve assembly.

The first variable correction speed embodiment of my invention operates as follows: With the piston 37 in the neutral position, the aileron control surfaces are in neutral position, and the cylindrical opening 106 is symmetrically restricted by metering block 104 as shown in Figure 6. When very small corrections are required of the automatic pilot in order to maintain level attitude the flow of the incoming fluid is restricted by the presence of metering block 104. As the piston rod 38 moves a small amount for small corrections, the cylindrical opening 106 of the restriction valve 48 also moves a small amount relative to block 104. Therefore, the fluid flow is still appreciably restricted and the correction is applied slowly. When larger corrections are required to counteract air disturbances or bumps and gusts, the cylindrical opening 106 of the restriction valve 48 moves farther away from the neutral position of the block 104 and opening 106. The farther the opening 106 travels from block 104, the less the restriction to the fluid flow becomes, due to the design of the metering block 104 shown in Figure 6 or the metering screw 109 shown in Figure 7. Therefore, for large corrections, since the restriction to flow of fluid becomes very much less, the speed of correction is greater. It is obvious that the action just described is obtained for either direction of movement from neutral. The action of restriction valve 50 is identical with that of the restriction valve 48, just described, and both of these valves are arranged to provide simultaneous restrictions to fluid coming in one side of the cylinder 36 and fluid going from the other side of cylinder 36 of the motor 35. It may be sufficient in connection with some installations to use only one valve; that is, the restriction valve 50 may be omitted and pipes 51a and 51b consolidated into a single pipe 51, directly connecting the inlet-outlet 40 with the right hand outlet of the oil pressure regulator 30.

In Figure 8, I show a second embodiment of my invention wherein a servo unit 110, consisting of an electric motor 111 and a controller 112, is operably connected at its right hand extremity to a control unit 113 and at its left hand extremity to a cable pulley-rheostat assembly 114. It will be noted that the control unit 113 consists solely of the air relay 23, no necessity existing for inclusion of the pump 18, the regulator 19, the sump 20, or the valves 21 and 22 of Figure 1. The cable pulley-rheostat assembly 114 is driven by the motor 111 through a shaft 115 and worm gears 116 and 117. A cable 118 is fixed at any suitable point to the outer surface of a pulley 119 forming an inner portion of the assembly 114. The cable 118 duplicates the function performed by the cable 52 of Figure 4, its upper central portion being fixed to openings 78a and 78b of the sliding plate 79. The cable 53 is spliced to the cable 118, as indicated. The assembly 114 is provided with a contactor arm 120, adapted to sweep in an arcuate path over rheostat segments 121a and 121b. The plate portion of the contactor arm 120 is electrically connected to a lead wire 122 of one of the rotor coils encased within the motor 111, while the remaining lead wire 123 of the other of the aforesaid rotor coils is electrically connected to the outer plate of a bi-plated contactor arm 124 of the controller 112. A lead wire 125 of one of the stator coils of the motor 111 is connected to an outer contactor segment 126 by means of a wire 127, while the remaining lead wire 128 of the aforesaid stator coils, is connected to an inner contactor segment 129 by means of a wire 130. It will be noted that the first lead wire 125 is further connected to an inner contactor segment 131 by means of a wire 132, while the second lead wire 128 is further commonly connected to an outer contactor segment 133 by means of a wire 134. The inner plate of the contactor arm 124 is electrically connected to one pole of a direct current source 135 by means of a wire 136. The other pole of the current source 135 is jointly connected to the two outer extremities of the rheostat segments 121a and 121b by means of wires 137 and 138, respectively. Returning to the contactor arm 124, that portion thereof extending to the right of journal pin 139 is operably connected to the control unit 113 by means of a connecting rod 140.

Operation of the second variable correction speed embodiment of my invention closely parallels that of the first. The air disturbances being identical, the gyro unit 1 of Figure 1 corrects for the above through the control unit 113 (air relay 23), the servo unit 110 and the cable pulley-rheostat assembly 114; i. e., reversing currents are caused to flow through the motor 111, induced by clockwise or counter-clockwise rotation of the contactor arm 124. Heretofore there was no secondary means for reducing initial flow to a minimum. In this second embodiment of my invention, I retard current flow brought about by reaction to small corrections through introduction of the rheostat segments 121a and 121b and the contactor arm 120, between one pole of my direct current source 135 and the lead wire 122 to one of the rotor coils of the motor 111. For larger corrections, as the contactor arm 120 approaches an outer end of either the rheostat segment 121a or 121b, the current flow increases, and the rotation of the motor 111 is "speeded up".

Although the description is specific to the illustrations in the drawings, it is to be understood that there may be numerous departures therefrom which will still be within the field and scope of my invention, so that I do not wish to be restricted thereto, but only insofar as the appended claims are so limited.

What I claim is:

1. In an automatic pilot for aircraft, the combination with reference responsive means for maintaining a predetermined flight condition, a control surface, a servo motor controlled by said means for operating said surface and a follow-up connection between said servo motor and said reference means; of additional means included in said follow-up connection and operated by said servo motor for regulating the control of the servo motor by said reference responsive means in such a manner that the speed of movement of said servo motor varies in predetermined relation to a predetermined change in the relation of said aircraft to said reference responsive means.

2. In an automatic control system, the combination with a source of fluid pressure, a fluid pressure operated part, valve means connecting said source to actuate said part and a reference means for automatically controlling said valve means for regulating the supply of power for operating said part; of metering means in series with said valve means and source and operable in response to the movement of said part for varying the rate of the power supply as a function of a predetermined change in the condition of said reference means and thereby obtain a predetermined variation in the speed of said power operated part, said variation being separate from and in addition to the control obtained by said valve means.

3. In an automatic pilot for aircraft, the combination with gyroscopic responsive fluid operated means for maintaining a predetermined flight condition, a control surface, a servo motor controlled by said means for operating said surface and a follow-up connection between said servo motor and said gyroscopic means; of fluid metering means additionally included in said follow-up connection and operated by said servo motor for regulating the control of the servo motor by said gyroscopic means in such a manner that the speed of movement of said servo motor varies in predetermined relation to a predetermined change in the relation of said aircraft to said gyroscopic means.

4. In an automatic control system, the combination with a source of power, a power operated part movable in either of two directions from a neutral position, means controlling the actuation of said part and a reference means for automatically controlling said first controlling means to regulate the supply of power for operating said part; of means in series with said source and said first controlling means and operable in response to the movement of said part to vary the rate of power supply as a function of a departure of said part from neutral position in either direction and thereby obtain a predetermined variation in the speed of said power operated part, said variation being separate from the control obtained by said other controlling means.

5. In an automatic control system, the combination with a source of power, a power operated part, means controlling the actuation of said part and a reference means for automatically controlling said first controlling means to regulate the supply of power for operating said part; of means in series with said source and said first controlling means and operable in response to the movement of said part for obtaining a predetermined increase in the speed of movement of said part for each increasing change in the magnitude of said movement, said increase being separate from the control obtained by said other controlling means.

6. In an automatic pilot for aircraft, the combination with a reference responsive means for maintaining a desired flight condition, a control surface, a servo motor controlled by said means for operating said surface and a follow-up connection between said servo motor and said reference means; of additional means included in said follow-up connection and operated by said servo motor for regulating the control of the servo motor in such a manner that the speed of movement of said servo motor varies in predetermined relation to a predetermined change in the relation of said aircraft to said reference means.

7. In an apparatus having a part to be operated by a source of electrical power in either of two directions from a neutral position and a given reference means for controlling the supply of power, electrical means responsive to the movement of said part to increase the rate of application of power as a function of a departure of said part from a neutral position in either direction to obtain a progressively increasing speed of said part in either direction as it departs from neutral.

8. In an automatic control system, the combination with a source of power, means adapted to be actuated by said source of power including a servo-motor and a member operated thereby, means controlling the actuation of said servo-motor and a given reference means for controlling said first controlling means to regulate said power supply, of means in series with said source of power and said first controlling means for regulating said power supply for obtaining a predetermined variation in the speed of movement of said member to the variation in the magnitude of said movement, said regulation being separate from the control obtained by said other controlling means.

9. In an apparatus having a part to be operated by a source of electrical power in either of two directions from a neutral position and a given reference means for controlling the supply of power, variable electrical means responsive to the movement of said part to increase the rate of application of power as a function of a departure of said part from a neutral position in either direction as it departs from neutral, and means for setting said variable speed means for obtaining minimum speed at the neutral position.

10. In an automatic pilot for aircraft, the combination with a control surface, an hydraulic servo-motor for operating said surface in either direction from a neutral position and valve means for controlling the actuation of said servo-motor, of metering means in series with said valve means and servo-motor and having communication with the liquid inlet and the liquid outlet of said servo-motor and connected to said servo-motor to be operated thereby so as to vary the speed of operation of said servo-motor in either direction from a neutral position corresponding to the neutral position of said surface in a predetermined manner.

11. In an automatic pilot for aircraft, the combination with a control surface, an electrically operated servo-motor for operating said surface in either direction from a neutral position and electrical means controlling said servo-motor, of resistance means in addition to said first controlling means and operated by said servo-motor to vary the speed of operation of said servo-motor in either direction from a neutral position corresponding to the neutral position of said surface in a predetermined manner.

12. In an automatic pilot for aircraft, the combination with a control surface and an electrically operated servo-motor for operating said surface in either direction from a neutral position, of adjustable resistance means operated by said servo-motor to progressively increase the speed of operation of said servo-motor in either direction from a neutral position corresponding to the neutral position of said surface in a predetermined manner.

13. In a fluid restriction valve comprising a housing, having two fluid cavities, a rotor operating therein and having an opening in communication with said cavities, a convex metering block disposed in one of said cavities and being so arranged that the maximum restriction to fluid flow through the opening is obtained when the rotor is in the neutral or symmetrical position, said restriction progressively decreasing as the rotor is turned in either direction from said neutral or central position.

14. In a fluid restriction valve, comprising a housing, having two fluid cavities, a rotor operating therein and having an opening in communication with said cavities, an adjustable metering screw disposed in one of said cavities and being so constructed and arranged that the maximum restriction to fluid flow through the opening is obtained when the rotor is in the neutral or symmetrical position, said restriction progressively decreasing as the rotor is turned in either direction from said neutral or central position.

15. In a fluid restriction valve, comprising a housing, having two fluid cavities, a rotor operating therein and havin an opening in communication with said cavities, a readily removable, adjustable metering screw disposed in one of said cavities and being so constructed and arranged that the maximum restriction to fluid flow through the opening is obtained when the rotor is in the neutral or symmetrical position, said restriction progressively decreasing as the rotor is turned in either direction from said neutral or central position.

FRANCIS G. NESBITT.